(12) United States Patent
Fromm et al.

(10) Patent No.: US 6,432,524 B1
(45) Date of Patent: Aug. 13, 2002

(54) ELECTRODE FOR FIELD CONTROL

(75) Inventors: Udo Fromm; Mats Leijon; Li Ming, all of Västerås; Dan Windmar, Vittinge, all of (SE)

(73) Assignee: ABB Research Ltd., Vasteras (SE)

( * ) Notice: Subject to any disclaimer, the term of this patent is extended or adjusted under 35 U.S.C. 154(b) by 0 days.

(21) Appl. No.: 09/297,739

(22) PCT Filed: Nov. 21, 1997

(86) PCT No.: PCT/SE97/01953

§ 371 (c)(1),
(2), (4) Date: Jul. 9, 1999

(87) PCT Pub. No.: WO98/22958

PCT Pub. Date: May 28, 1998

(30) Foreign Application Priority Data

Nov. 22, 1996 (SE) .............................................. 9604282

(51) Int. Cl.⁷ ................................................. B32B 3/00
(52) U.S. Cl. ................................ 428/313.3; 428/313.5; 521/56; 174/35 R; 336/84 R; 336/84 C
(58) Field of Search .......................... 428/313.3, 313.5; 174/35 R; 336/84 R, 84 C; 521/56

(56) References Cited

U.S. PATENT DOCUMENTS 3,911,384 A    10/1975  Andersson et al.
4,073,712 A  *  2/1978  Means et al. ................ 204/186
4,379,999 A     4/1983  Kimura et al.
4,639,282 A  *  1/1987  Moritz ......................... 156/53
5,194,459 A  *  3/1993  Sato et al. ................... 523/219
5,591,317 A  *  1/1997  Pitts, Jr. ...................... 204/667

FOREIGN PATENT DOCUMENTS

| DE | 2 144 498   |        3/1973 |          |
|----|-------------|---------------|----------|
| EP | 0 075 884 A1 | 4/1983 | ............ H05K/9/00 |
| EP | 0 075 884 B1 | 4/1983 | ............ H05K/9/00 |
| EP | 0 192 165 A1 | 8/1988 | ........... H01F/27/36 |

* cited by examiner

*Primary Examiner*—Blaine Copenheaver
*Assistant Examiner*—Leanna Roché
(74) *Attorney, Agent, or Firm*—Connolly Bove Lodge & Hutz LLP

(57) ABSTRACT

An electrode for control of an electric field strength in a gaseous electrically insulating medium at the surface of the electrode and in the vicinity of the electrode, comprising an electrically conducting inner electrode (1') and an electrically non-conducting layer (8) on at least parts of the surface of the inner electrode, wherein the thickness of the non-conducting layer is at least 5% of the mean diameter of the inner electrode and that the relative dielectric constant of the non-conducting layer is smaller than 3.

12 Claims, 6 Drawing Sheets

ELECTRODE FOR FIELD CONTROL

This application claims priority from PCT/SE97/01953 filed on Nov. 21, 1997, which claims priority from Swedish application Ser. No. 9604282-5 filed on Nov. 22, 1996.

TECHNICAL FIELD

The present invention relates to an electrode for control of an electric field in a gaseous electrically insulating medium.

BACKGROUND ART

Electrically conducting objects at a high electric potential relative to the surroundings give rise to high electric field strengths in their vicinity. This applies particularly to objects with a small radius of curvature and parts projecting from the object into the surrounding insulating medium.

If the electric field strength exceeds the dielectric strength $E_0$ of the medium, in dependence on the degree of inhomogeneity of the electric field and the change of the voltage with time, this leads to electric partial discharges from the electrode surface and/or an electric breakdown through the medium to another electrically conducting object or a ground plane.

Electric breakdowns must inevitably be prevented since they entail an electric short-circuit of the equipment, where the electrodes are included.

Also partial discharges are undesirable, since, among other things, they give rise to radio interference, energy losses and chemical degradation of material in that the partial discharges generate chemically aggressive and poisonous substances such as ozone and nitric oxides in air and a number of fluorine and sulphur compounds in the technical insulating gas sulphur hexafluoride. Partial discharges, which are harmless per se, may make the measurement of partial discharges of other parts of the equipment impossible.

Commonly used methods of reducing the electric field strength in the vicinity of electrically conducting objects comprise selecting, in the entire design and dimensioning of devices intended for high electric voltages, mutual distances between electrically conducting objects and radii of curvature on the surfaces thereof, such that the dielectric strength of the medium is not attained at any place in the device.

Since such dimensioning would often lead to very large dimensions of the equipment, areas with especially high local field strengths, such as the high-voltage side of bushings or conductor bends in gas-insulated switchgear, GIS, are provided with screening electrodes which have sufficient radii of curvature to keep the electric field strength below the dielectric strength of the medium. The electric field strength E in the vicinity of an electrically conducting object is of the order of magnitude of $E \approx U/R$, where U is a typical electric potential difference for the equipment and R is the radius of curvature. This implies that the smallest allowable radius $R_0$ of curvature is about $U/E_0$. The radius of curvature, in its turn, is dimensioning for the dimensions of the screening electrode, which often becomes a significant part of the dimensions of the whole device.

Large screening electrodes increase the capacitance of the screening part. For many fields of use, the increasing capacitance implies an unnecessary load on the voltage/current source. The electrostatic energy in the device which is released during a short-circuit, which, for example, is caused by an electric breakdown, increases with increased capacitance.

A large screening electrode reduces the maximum electric field strength in its vicinity. However, it causes a higher field strength at larger distances than a smaller electrode, which is often disturbing, since maximum field strength outside a device are often specified and must not be exceeded.

These conditions are illustrated in the simplest way by means of a model according to FIG. 1, where the screening electrode 1 is assumed to be a sphere with a radius $r_0$ and at an electric potential U towards a distant ground plane 2. With these assumptions, the electric field strength at the distance r from the centre of the electrode is $$E = U(r_0/r^2),$$

and it increases proportionally to the radius $r_0$ of the electrode. The capacitance C of the electrode is $$C = 4\pi \epsilon_r \epsilon_0 r_0$$

where $\epsilon_r$ is the relative dielectric permittivity of the medium and $\epsilon_0$ is the dielectric constant. Also the capacitance thus increases proportionally to the radius $r_0$ of the electrode.

A typical embodiment of screening electrodes according to the state of the art is shown in FIG. 2, where a high-voltage apparatus 3, for example a capacitor, terminates in a toroidal screening electrode 1. For high voltages, composite screening electrodes are often used, a typical embodiment being shown in FIGS. 3a, 3b and 3c from EP patent specification EP 0 075 884 B1, where FIG. 3a shows a screening electrode 1 composed of 12 disc-shaped electrode segments 1a which are fixed to an icosahedron-shaped frame 5 composed of rods 6 according to FIG. 3b, with the fixing elements placed in a depression 4 in the electrode element to fix the electrodes to the icosahedron corners 7. An electrode segment 1a with the depression 4 is shown in cross section in FIG. 3c. A composite electrode according to EP 0 075 884 is lighter and simpler to manufacture than a corresponding electrode which is made up of a coherent electrode, but its dimensions have not be diminished.

When changing from two-dimensional electrode devices as, for example, GIS lines, where the inner conductor is here interpreted as an electrode, to three-dimensional configurations, for example line bends, the field strength increases since the curvature of the surface is larger for a sphere than for a cylinder with the same radius. FIG. 7 shows a 90° line bend for GIS according to the state of the art. The cylinder-shaped inner conductor 10 has the radius $r_c$, the tubular outer conductor/screen 11 has the radius $R_c$. In the actual line bend, the screen assumes the shape of a sphere 12 with the radius $R_s$ and the inner conductor, the electrode, becomes a sphere 1 with the radius $r_s$. For the line bend to be free of discharges, the following must apply, namely that, $r_s > r_c$ and $R_s > R_c$; usually, the radii at the line bend are about 50% larger than in the straight lines.

It is also known to provide the electrodes with an electric non-conducting covering, for example to make difficult the emission of photoelectrons from the electrode surface, or as corrosion protection. However, these coverings are thin compared with the dimensions of the electrode, and their influence on the electric field around the electrode is therefore negligible. In this way, the dimensions of the electrode cannot be reduced.

SUMMARY OF THE INVENTION

An electrode for field control according to the invention solves the task of preventing breakdown or partial discharges in a gaseous insulating medium with reduced external dimensions and reduced capacitance.

An electrode for field control according to the invention comprises an inner electrode with an electrically conducing surface which is surrounded by a thick layer of an electrically insulating material with a low relative dielectric permittivity, preferably a polymeric foam containing gas bubbles or a matrix in which hollow gas-filled microspheres are embedded. By a thick layer is here meant a layer in which the ratio of the thickness d of the layer to the diameter 2r of the inner electrode is greater than 0.05, preferably greater than 0.15 and still more preferably 0.25. For non-spherical electrodes, the diameter 2r of the inner electrode is considered to be the mean diameter of the electrode. A sufficiently good approximation of the mean diameter is here the mean value of the diameter in two directions perpendicular to each other. Inner electrode here also means an electrode element in a composite electrode. To achieve the effect of the invention, only those parts of the inner electrode, where a considerable increase of the electric field strength occurs, need to be covered with the non-conducting layer. Preferably, at least that one-third of the surface of the inner electrode is covered which, without covering with the layer, would exhibit the highest field strength.

The mode of operation of the invention can be most readily illustrated by means of a model according to FIG. 4, in which the inner electrode is assumed to be sphere 1' with the radius $r_1$ and at an electric potential U towards a distant ground plane 2, where the inner electrode is surrounded by a concentric layer 8 of electrically insulating material with a thickness of $r_2-r_1$ where $r_2$ is the outer radius of the insulating layer and 9 its outer edge. For the sake of simplicity, the insulating material is assumed to have such a high proportion of internal cavities, as gas bubbles or hollow microspheres, that the relative dielectric constant of the material is $\in_r \approx 1$, as is the dielectric constant of the gaseous medium. Since the diameters of the inner cavities are chosen so small that the dielectric strength of the gas contained in the cavity according to Paschen's law is considerably greater than the dielectric strength of a macroscopic gap within the same gas, this insulating material has a considerably greater dielectric strength than the gas surrounding the electrode. Typical mean diameters are smaller than 300 micrometres. For a more detailed analysis of dielectric strengths in polymeric foams, reference is made to an article "Breakdown of Polyurethane Hard-foam Insulation under Short-time HV Stress" by D. Koenig, B. Bayer and H. J. Heller in IEEE Transactions on Electrical Insulation, Vol. 24, No. 2, April 1989, pages 239–248. In this case with $\in_r \approx 1$, the same relations apply to the field strength at the distance r from the centre of the electrode and the capacitance as to an electrically conducting sphere with the radius $r_1$ at potential U towards a distant ground plane as shown under the discussion of the background art:

$$E=U(r_0/r^2) \quad C=4\pi\in_r\in_0 r_0$$

It can now be shown that, for an insulating medium with a dielectric strength which is $k \cdot E_0$ with $E_0$ as the dielectric strength of the gaseous medium, an electrode according to the invention may be designed where the field strength at the surface of the inner electrode falls below the dielectric strength $k \cdot E_0$ of the insulating material, and the field strength at the outer surface of the insulating layer falls below the dielectric strength $E_0$ of the gaseous medium if the conditions $$r_1 > r_0/k \text{ and } r_2 > r_0/\sqrt{k}$$

are fulfilled, where $r_0$ is the radius of an electrode according to the prior art (electrically conducting sphere) where the dielectric strength $E_0$ of the gaseous medium is attained at the surface of the electrode. For example, the radius of the inner electrode is reduced, and hence also the capacitance, by a factor of four and the outer radius of the insulating layer is reduced by a factor of two if k=4.

If the relative dielectric constant of the insulating material is $\in_r>1$, the possible outer radius $r_2$ becomes somewhat larger. When maintaining the ratio $r_2/r_1=2$, as in the example above, the following applies instead $$r_2=r_0/(1+\in_r^{-1})$$

For $\in_r=1.3$, a typical value of a foamed plastic, thus $$r_2=0.57 \; r_0,$$

which is still a considerable reduction of the size of the electrode. For the insulating layer to have a noticeable effect according to the invention, its relative dielectric constant $\in_r$ should be smaller than 3, preferably smaller than 2 and still more preferably smaller than 1.5

An electrode according to the invention is preferably used in electric equipment for voltages exceeding 1 kV.

BRIEF DESCRIPTION OF THE DRAWINGS

FIG. 3c shows a disc-shaped electrode segment of the screening electrode according to FIG. 3a.

DESCRIPTION OF THE PREFERRED EMBODIMENTS

Figure 1:
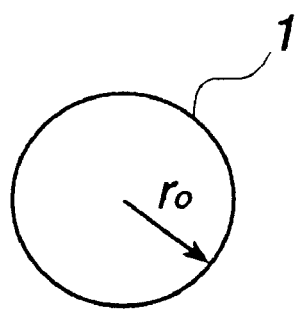
FIG. 1 shows an explanatory sketch of a screening electrode according to the prior art as an electrically conducting sphere.
Figure 1:
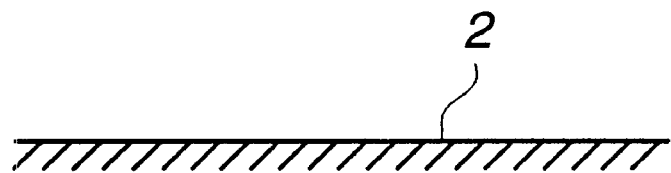
Figure 2:
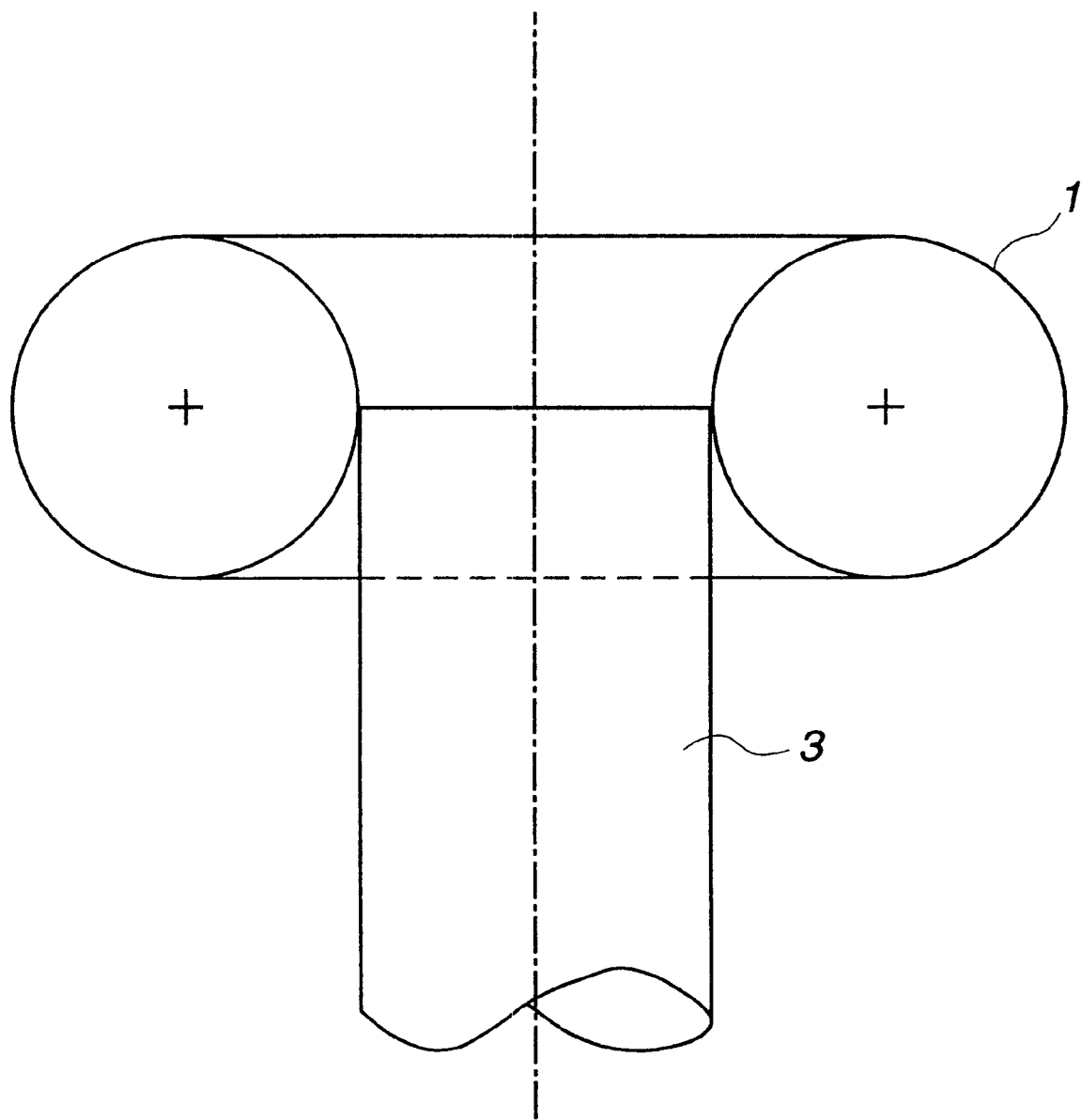
FIG. 2 shows a toroidal screening electrode according to the prior art.
Figure 5:
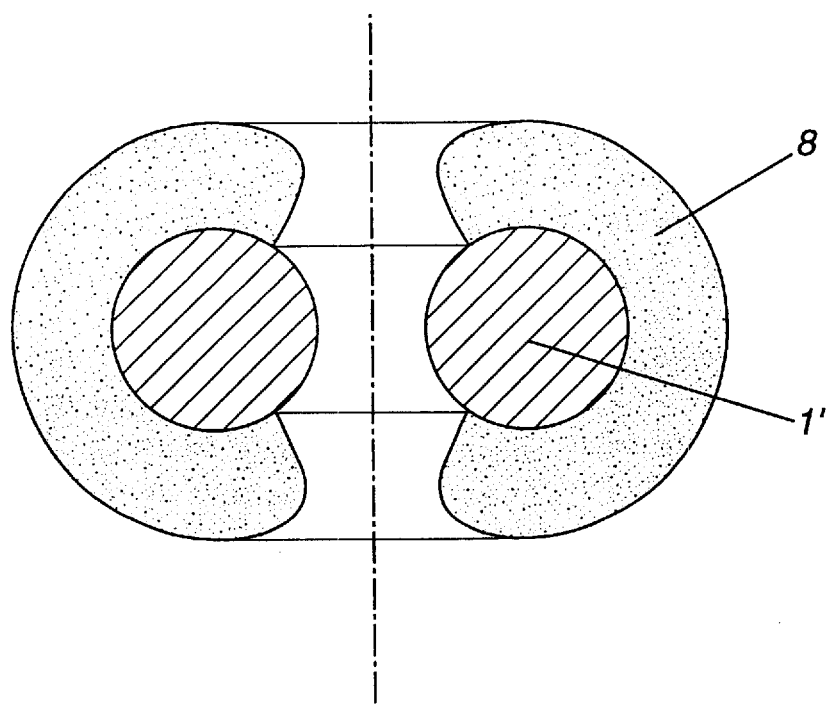
FIG. 5 shows a toroidal screening electrode with a non-conducting layer according to the invention.

In one embodiment of the invention, the toroidal screening electrode shown in FIG. 2 is improved by providing, as shown in FIG. 5, an inner toroidal electrode 1' with a non-conducting layer 8 on a major part of its surface. That part of the electrode which is directed towards the symmetry axis (dash-dotted) is screened from high field strengths by the very toroid shape and hence need not be covered. The outside diameter of the toroidal screening electrode according to the invention becomes considerably smaller than in the corresponding toroidal screening electrode according to the prior art.

Figure 3A:
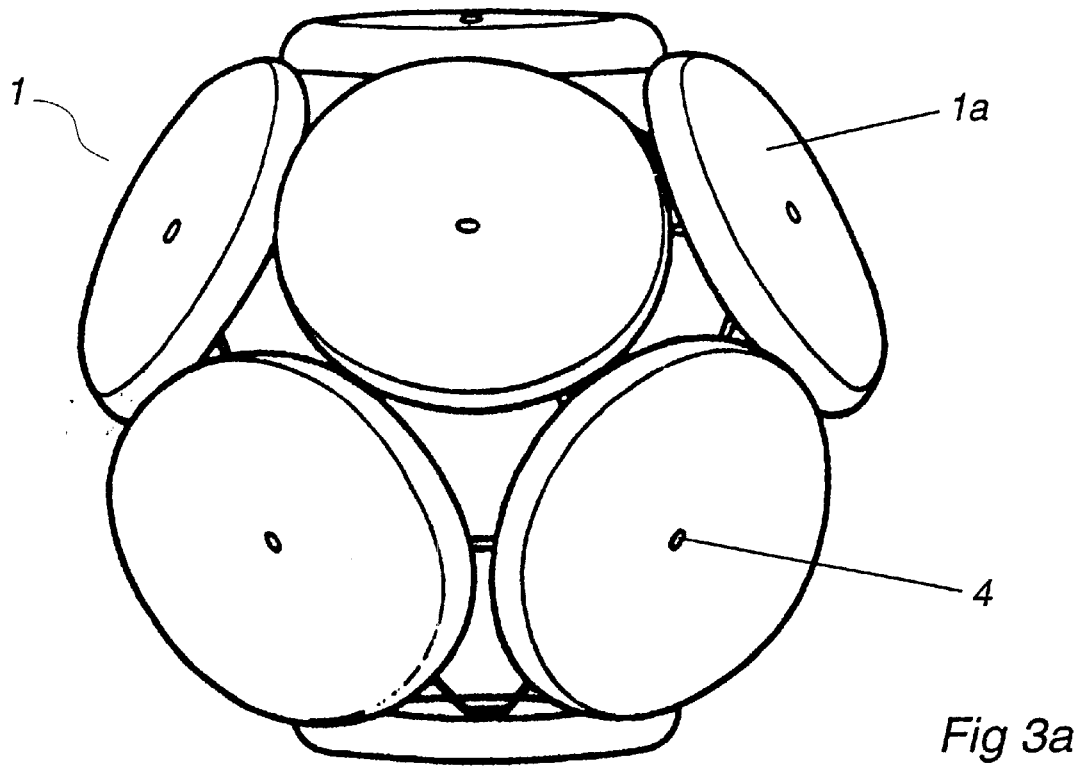
FIG. 3a shows a screening electrode according to the prior art, composed of disc-shaped electrode segments.
Figure 3B:
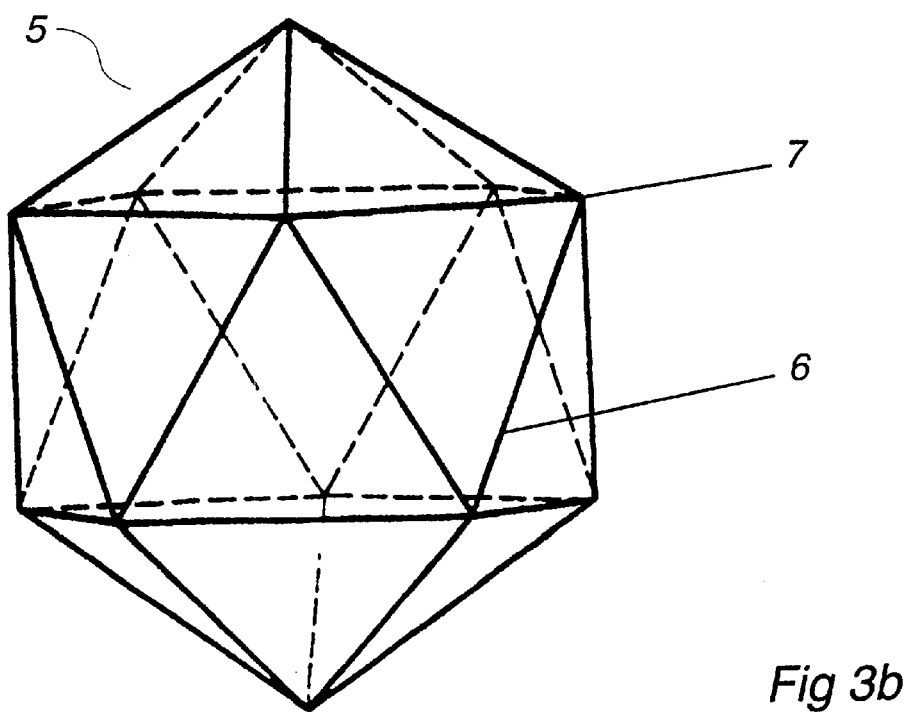
FIG. 3b shows an icosahedron-shaped frame to which the electrode segments according to FIG. 3a are attached.
Figure 3C:
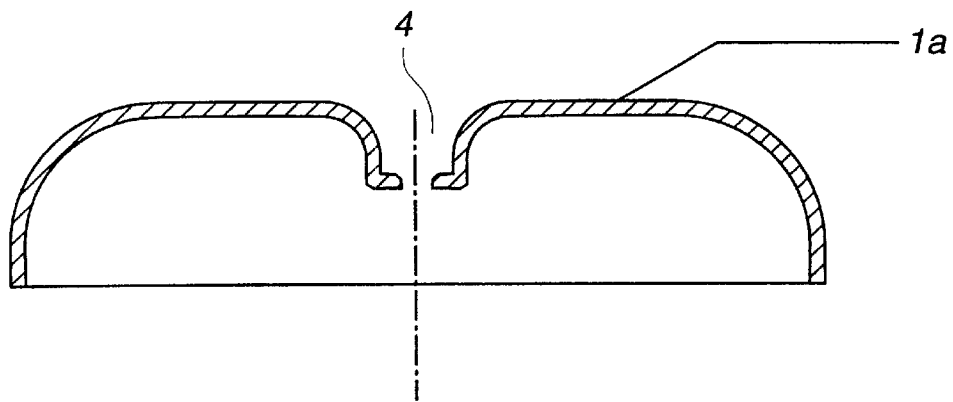
Figure 4:
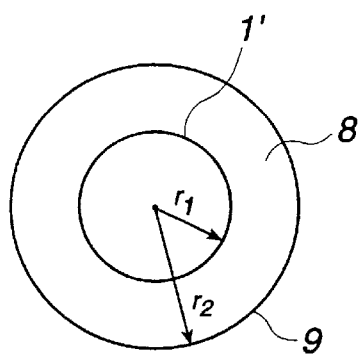
FIG. 4 shows an explanatory sketch of a screening electrode according to the invention with a concentric on-conducting layer on an electrically conducting sphere.
Figure 4:
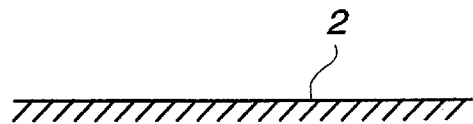
Figure 6:
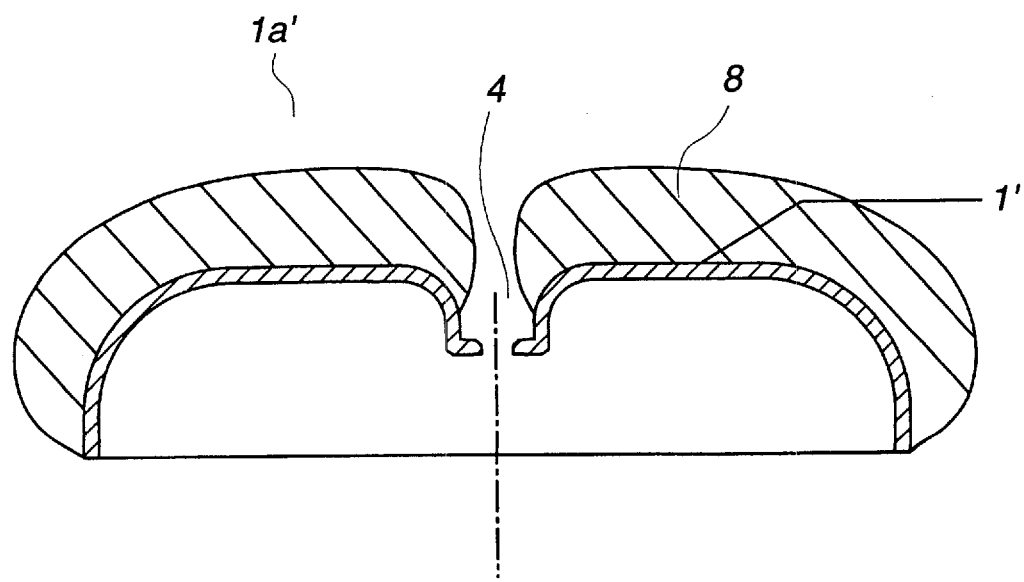
FIG. 6 shows an electrode segment with a non-conducting layer for a composite screening electrode according to the invention.

In another embodiment of the invention, the screening electrode composed of electrode segments, shown in FIGS. 3a–3c, is improved in that, as shown in FIG. 6, at least one of its electrode segments 1a', on the major part of the surface of the inner electrode 1', comprises a non-conducting layer 8. Also in this case, the outside diameter of the composite screening electrode according to the invention is considerably smaller than in the corresponding composite screening electrode according to the prior art. Also the depression 4 may be filled with a non-conducting material (not shown).

It may be advantageous to allow the non-conducting layer to constitute the mechanically supporting part of the screening electrode, where the inner electrode is made in the form of an electrically conducting covering on the inner side of the layer. The covering may, for example, be applied by painting, deposition of evaporated metal, or chemical precipitation of an electrically conducting substance.

Figure 7A:
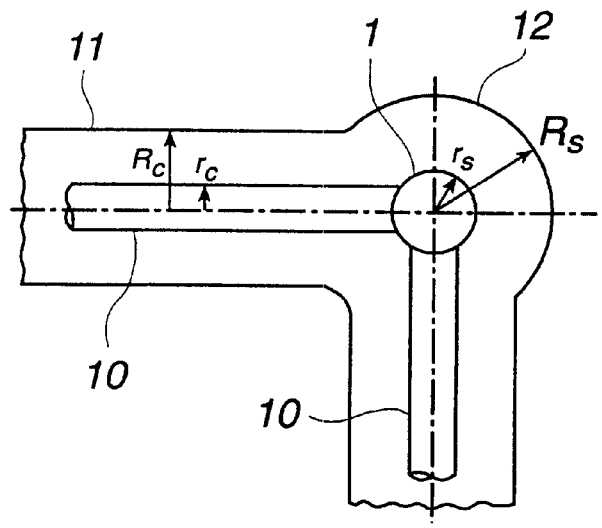
FIG. 7a shows a GIS line bend according to the prior art.
Figure 7B:
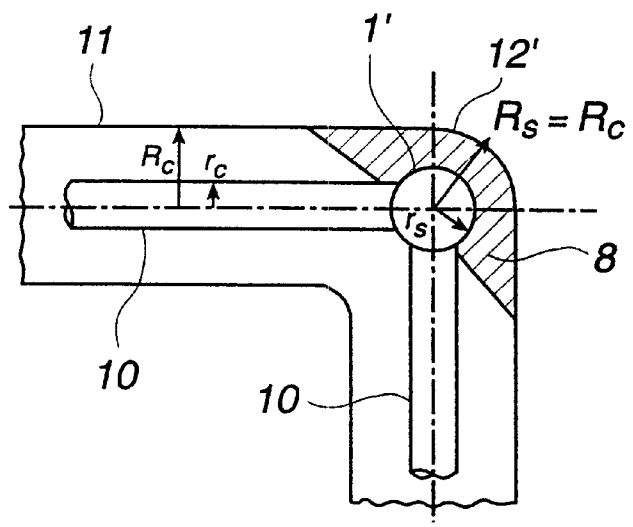
FIG. 7b shows a GIS line bend comprising a non-conducting layer according to the invention.

In an additional embodiment of the invention, the GIS line bend shown in FIG. 7a is improved, as shown in FIG. 7b, by placing a non-conducting material 8 between the spherical, inner conductor 1' at the line bend and the outer conductor/the screen 12' at the line bend. The radius $R_s$ may then be equal to the radius $R_c$ of the straight sections, such that the space requirement for the line bend is reduced. Also the inner radius $r_s$ may be reduced. The inner conductor in the line bend may also have the same shape as an ordinary pipe bend (not shown).

What is claimed is:

1. An electrode for control of an electric field strength in a gaseous electrically insulating medium at the surface of the electrode and in the vicinity of the electrode, comprising an electrically conducting inner electrode (1') and an electrically non-conducting layer (8) comprising a polymeric foam on at least parts of the surface of the inner electrode, and the thickness of the non-conducting layer is at least 5% of the mean diameter of the inner electrode and that the relative dielectric constant of the non-conducting layer is smaller than 3.

2. An electrode according to claim 1, wherein the thickness of the non-conducting layer is at least 15% of the mean diameter of the inner electrode.

3. An electrode according to claim 1, wherein the thickness of the non-conducting layer is at least 25% of the mean diameter of the inner electrode.

4. An electrode according to claim 1, wherein the relative dielectric constant of the non-conducting layer is less than 2.

5. An electrode according to claim 1, wherein the relative dielectric constant of the non-conducting layer is less than 1.5.

6. An electrode according to claim 1, wherein at least one-third of the surface of the inner electrode is covered with the non-conducting layer which, without covering with the layer, would exhibit the highest electric field strength.

7. An electrode according to claim 1, wherein the non-conducting layer comprises hollow gas-filled microspheres.

8. An electrode according to claim 7, wherein the mean diameter of the gas-filled microspheres is less than 300 micrometers.

9. An electrode according to claim 1, wherein the non-conducting layer (8) constitutes the supporting part of the electrode and the inner electrode (1') is made as an electrically conducting covering on the inner side of the non-conducting layer.

10. An electrode according to claim 1, wherein the inner electrode (1') is in electrical contact with an inner conductor (10) in a gas-insulated line which comprises an outer conductor (11, 12) and that the non-conducting layer (8) is arranged between the inner electrode and the outer conductor (12).

11. An electrode which comprises at least two electrode elements (1a'), wherein at least one electrode element consists of an electrode according to claim 1.

12. An electrode according to claim 1, wherein it is used in electrical equipment for electric voltages exceeding 1 kV.

* * * * *